(12) United States Patent
Sagi et al.

(10) Patent No.: US 12,307,290 B2
(45) Date of Patent: May 20, 2025

(54) CLOUD-BASED DEPLOYMENT OF COMMUNICATION SERVICES

(71) Applicant: G.S. CONSULTING & RESEARCH CORRENET LTD., Nes Ziona (IL)

(72) Inventors: Gonen Sagi, Karmei Yosef (IL); Avi Zollmann, Nes Ziona (IL)

(73) Assignee: G.S. CONSULTING & RESEARCH CORRENET LTD., Nes Ziona (IL)

( * ) Notice: Subject to any disclaimer, the term of this patent is extended or adjusted under 35 U.S.C. 154(b) by 491 days.

(21) Appl. No.: 17/995,412

(22) PCT Filed: Apr. 7, 2020

(86) PCT No.: PCT/IL2020/050419
§ 371 (c)(1),
(2) Date: Oct. 4, 2022

(87) PCT Pub. No.: WO2021/205426
PCT Pub. Date: Oct. 14, 2021

(65) Prior Publication Data
US 2023/0153152 A1 May 18, 2023

(51) Int. Cl.
*G06F 9/48* (2006.01)
*H04L 41/08* (2022.01)
*H04L 41/082* (2022.01)
*H04M 7/00* (2006.01)

(52) U.S. Cl.
CPC .......... *G06F 9/4881* (2013.01); *H04L 41/082* (2013.01); *H04L 41/0879* (2013.01); *H04M 7/0084* (2013.01)

(58) Field of Classification Search
None
See application file for complete search history.

(56) References Cited

U.S. PATENT DOCUMENTS

| 6,101,481 | A | 8/2000 | Miller | |
| 6,907,515 | B2 * | 6/2005 | Seal | G06F 9/45504 712/209 |
| 8,261,295 | B1 * | 9/2012 | Risbood | H04L 41/5012 717/177 |

(Continued)

OTHER PUBLICATIONS

International Search Report for PCT Appln. No. PCT/IL2020/050419 dated Jun. 23, 2020, 2 pgs.

*Primary Examiner* — Van H Nguyen
(74) *Attorney, Agent, or Firm* — Tutunjian & Bitetto, P.C.

(57) ABSTRACT

A method, system and computer program product for cloud-based deployment of communication services. The method includes obtaining data related to an on premise communication system, and determining a multiplicity of tasks to be executed for migrating the on premise communication system to a cloud-based communication system. Each task from the multiplicity of tasks is associated with a type, a configuration, and an owner. Information of a multiplicity of user attempts to change the configuration during or following execution of some of the multiplicity of tasks of a particular type is collected. When the multiplicity of user attempts exceeding a predetermined amount, an owner of a task associated with the configuration is notified, and when approved by the owner, further tasks of the particular type yet to be executed are modified to conform to the configuration.

16 Claims, 3 Drawing Sheets

(56) References Cited

U.S. PATENT DOCUMENTS

| | | | |
|---|---|---|---|
| 8,402,553 B2 * | 3/2013 | Graham | G06F 21/57 |
| | | | 713/100 |
| 8,756,599 B2 * | 6/2014 | Devarakonda | G06F 9/5077 |
| | | | 718/1 |
| 9,461,969 B2 * | 10/2016 | Watt | H04L 63/0272 |
| 9,602,599 B2 * | 3/2017 | Bhattacharya | G06F 9/4856 |
| 10,432,752 B2 * | 10/2019 | Lee | G06F 9/455 |
| 10,530,854 B2 * | 1/2020 | Savage | H04L 67/1095 |
| 10,685,115 B1 * | 6/2020 | Lieberman | H04L 63/1416 |
| 10,896,248 B2 * | 1/2021 | Salama | G06V 40/40 |
| 10,917,308 B2 * | 2/2021 | Bhat | H04L 41/0895 |
| 11,611,487 B2 * | 3/2023 | Aftab | H04L 67/1097 |
| 2017/0163587 A1 | 6/2017 | Johnson et al. | |
| 2019/0295015 A1 | 9/2019 | Kosaka | |

* cited by examiner

CLOUD-BASED DEPLOYMENT OF COMMUNICATION SERVICES

TECHNICAL FIELD

The present disclosure relates to network monitoring systems in general, and to a method and apparatus for planning, implementing and monitoring deployment of communication services, in particular.

BACKGROUND

A communication system, including a telephony system is one of the most significant backbones of many organizations, such as commercial companies, government offices, educational institutions, or others. In the last decades, a significant part of such communication systems is carried using Voice over Internet Protocol (VoIP). The term VoIP generally refers to methods and technologies for the delivery of voice communications and multimedia sessions over Internet Protocol (IP) networks, such as the Internet. VoIP refers to the provisioning of communications services, such as but not limited to voice, voice-messaging, texts, or others over the public Internet, rather than via the public switched telephone network (PSTN), which is also known as plain old telephone service (POTS).

The steps and principals involved in originating VoIP telephone calls are similar to traditional digital telephony and involve signaling, channel setup, digitization of the analog voice signals, and encoding. However, instead of being transmitted over a circuit-switched network, the digital information is packetized, and transmission occurs as IP packets over a packet-switched network. The network transports media streams using dedicated media delivery protocols that encode audio and video with audio codecs and video codecs, respectively.

VoIP systems typically include VoIP phones and/or VoIP capabilities available on personal computers and other Internet access devices. VoIP allows modern communication technologies (including telephones, smartphones, voice and video conferencing, email, and presence detection) to be consolidated within a single unified communications system.

In many organizations, the VoIP is implemented as on-premise systems, such that the VoIP services are used as a product purchased and maintained by the organization. This incurs high deployment and maintenance costs for the organization, including purchasing the equipment, training technicians, ongoing maintenance, or the like, and provides low flexibility in adding features or otherwise upgrading the systems.

BRIEF SUMMARY

One exemplary embodiment of the disclosed subject matter is a computer-implemented method comprising: obtaining data related to an on premise communication system; determining a multiplicity of tasks to be executed for migrating the on premise communication system to a cloud-based communication system, wherein each task from the multiplicity of tasks is associated with a type, a configuration, and an owner; collecting information of a multiplicity of user attempts to change the configuration during or following execution of some of the multiplicity of tasks of a particular type; subject to the multiplicity of user attempts exceeding a predetermined amount, notifying an owner of a task associated with the configuration; and subject to approval by the owner, modifying further tasks of the particular type yet to be executed, to conform to the configuration. Within the method, the multiplicity of tasks optionally comprise a multiplicity of abstract tasks, and wherein the method can further comprise: for each abstract task in a first portion of the multiplicity of abstract tasks, determining a concrete task thereof and executing the concrete task thereof, wherein said collecting information is performed after the concrete tasks of the first portion are executed; and executing a second portion of the multiplicity of abstract tasks, wherein the second portion comprises the further tasks of the particular type yet to be executed, wherein said executing comprises determining concrete tasks for the second portion and executing thereof. The method can further comprise executing the some of the multiplicity of tasks of the particular type. Within the method, the user attempts optionally include an attempt to add a new functionality in the cloud-based communication system. Within the method, the user attempts optionally include an attempt to change label structure of an extension in the cloud-based communication system. The method can further comprise modifying tasks of the particular type to conform to the configuration, when migrating a second on-premise communication system. Within the method, the multiplicity of tasks are optionally created automatically from a plurality of options, based upon services provided by the on premise communication system. Within the method, the multiplicity of tasks are optionally arranged in a Gantt chart indicating execution order. Within the method, the information of the multiplicity of user attempts is optionally collected by monitoring execution of the multiplicity of tasks and user actions related to the configuration. Within the method, the information of the multiplicity of user attempts is optionally obtained from an Application Program Interface (API) of a cloud system providing the cloud-based communication system.

Another exemplary embodiment of the disclosed subject matter is a system having a processor, the processor being configured to perform the steps of: obtaining data related to an on premise communication system; determining a multiplicity of tasks to be executed for migrating the on premise communication system to a cloud-based communication system, wherein each task from the multiplicity of tasks is associated with a type, a configuration, and an owner; collecting information of a multiplicity of user attempts to change the configuration during or following execution of some of the multiplicity of tasks of a particular type; subject to the multiplicity of user attempts exceeding a predetermined amount, notifying an owner of a task associated with the configuration; and subject to approval by the owner, modifying further tasks of the particular type yet to be executed, to conform to the configuration. Within the system, the multiplicity of tasks optionally comprise a multiplicity of abstract tasks, and the processor is optionally configured to: for each abstract task in a first portion of the multiplicity of abstract tasks, determining a concrete task thereof and executing the concrete task thereof, wherein said collecting information is performed after the concrete tasks of the first portion are executed; and executing a second portion of the multiplicity of abstract tasks, wherein the second portion comprises the further tasks of the particular type yet to be executed, wherein said executing comprises determining concrete tasks for the second portion and executing thereof. Within the system the processor is optionally further configured to execute the some of the multiplicity of tasks of the particular type. Within the system, the user attempts optionally include an attempt to add a new functionality in the cloud-based communication system, or an attempt to change label structure of an extension in the cloud-based communication system. Within the system, the processor is optionally further configured to modify tasks of the particular type to conform to the configuration, when migrating a second on-premise communication system. Within the system, the multiplicity of tasks are optionally created automatically from a plurality of options, based upon services provided by the on premise communication system. Within the system, the multiplicity of tasks are optionally arranged in a Gantt chart indicating execution order. Within the system, the information of the multiplicity of user attempts is optionally collected by monitoring execution of the multiplicity of tasks and user actions related to the configuration. Within the system, the information of the multiplicity of user attempts is optionally obtained from an API of a cloud system providing the cloud-based communication system.

Yet another exemplary embodiment of the disclosed subject matter is a computer program product comprising a non-transitory computer readable medium retaining program instructions, which instructions when read by a processor, cause the processor to perform: obtaining data related to an on premise communication system; determining a multiplicity of tasks to be executed for migrating the on premise communication system to a cloud-based communication system, wherein each task from the multiplicity of tasks is associated with a type, a configuration, and an owner; collecting information of a multiplicity of user attempts to change the configuration during or following execution of some of the multiplicity of tasks of a particular type; subject to the multiplicity of user attempts exceeding a predetermined amount, notifying an owner of a task associated with the configuration; and subject to approval by the owner, modifying further tasks of the particular type yet to be executed, to conform to the configuration.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to enable the provisioning of communication services to customers by a cloud-based platform, rather than by on-premise systems.

Some currently used communication systems, such as private branch exchange (PBX), server-based communication systems, or the like, may be configured to switch calls between enterprise users on local lines while allowing all users to share a certain number of external phone lines. One of the purposes of such systems may be to save the cost of allocating a line for each user to the telephone company's central office. However, such systems are typically purchased, deployed, maintained and monitored by the enterprise rather than by a communication service provider, and may require further resources and high cost for installation, adaptation and maintenance for the customer.

On the other hand, deployment of a cloud-based communication solution, or migration to the same from an existing on-premise communication solution, may be a complicated task that requires months of preparation and thousands of operations to be performed, in a specific order by a plurality of role holders.

Thus, it may be required to provide an efficient and easy method for migrating from an on-premise communication system to a cloud-based communication system which provides at least the same services, and possibly additional ones. The method should be as automatic as possible, and provide a system which matches the needs of the customer.

Another technical problem of the disclosure relates to the need to adapt settings or aspects of the cloud-based communication solution, in accordance with users, including end users' preferences. However, not all preferences are known up front, and some are introduced later on when end users try to make changes to one or more aspects of the system. Thus, there is a need to monitor the changes or change attempts and adapt accordingly.

One technical solution comprises providing an end-to-end system, which provides design, detailed design, implementation, monitoring and adaptation for the migration from an on-premise communication system to a cloud-based communication system.

Figure 1:
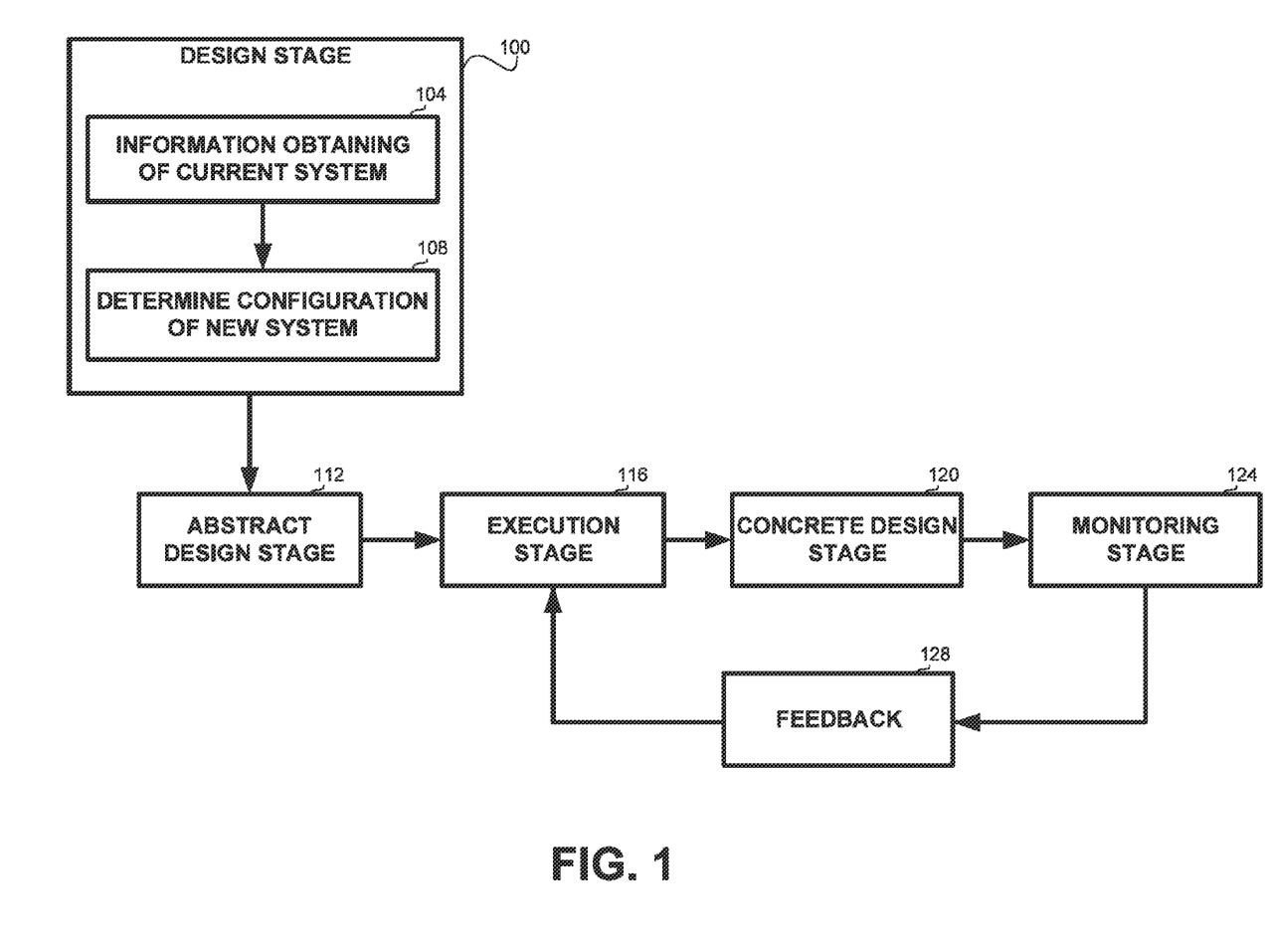
FIG. 1 shows a generalized flowchart diagram of a method for migrating a communication system, in accordance with some exemplary embodiments of the disclosed subject matter.

Referring now to FIG. 1, showing a generalized flowchart of the stages in the migration process.

Design stage 100 may comprise Information Obtaining Step 104 for obtaining information about the on-premises existing communication system, also referred to as legacy systems. The information can be obtained, for example, from using Application Program Interface (API) of the existing systems, configuration files, user-provided information, or the like. The information may include but is not limited to any of the following: existing servers and their configuration, existing phone lines, number and geographic distribution of users, telephone device types, provided services such as call waiting, conference call, voice mail, follow me, or the like.

Design Stage 100 may then continue with stage 108 of automatically determining the configuration of the new system, including for example: how to physically position cloud servers for serving various geographic regions, including providing redundancy for ensuring adequate service; how to distribute the servers into clusters; the required resources at each region, such as storage space and bandwidth; the number of end devices and their geographic distribution; the number of extensions; the services and features enabled for each device or group of devices, for example by geographic region, and others.

The process may continue with Abstract Design Stage 112, which may comprise deriving abstract tasks or action items from the design, such as: setting up servers, installing software, and clustering servers for a first region; installing and configuring specific extensions associated with the first region; setting up servers for a second region; setting up, installing software and configuring extensions associated with the second region; or the like. Each such abstract task may be associated with one or more roles of persons responsible for the task. It will be appreciated that the process may repeat for additional regions.

The process may continue with Execution Stage 116, which may comprise executing tasks. In some exemplary embodiments, some tasks can be performed automatically, such as setting an extension. Additionally or alternatively, some tasks may be performed manually. It is noted that the execution stage may be performed iteratively, wherein in each iteration different tasks are being executed. For example, execution stage of one location of the organization out of plurality of locations, may be performed in an iteration. As another example, the execution stage may be limited to a department, a floor, or any other portion of the organization's telecommunication system.

In some exemplary embodiments, some tasks that are generated during Abstract Design Stage 112, may be abstract. In order for such tasks to be executed, concrete tasks may be created based thereon during Concrete Design Stage 120, which may occur as a preliminary part of Execution Step 116. In Concrete Design Stage 120 concrete tasks may be derived from the abstract tasks, such as approving budget for tasks of the migration; purchasing servers for a region, wherein the servers are appropriate for providing cloud computing services, installing and configuring the servers at the region; installing and configuring extensions, or the like. Each such concrete task may be associated with a specific name of a person responsible for the task. The concrete tasks may be generated at a later time, for example after one week, one month, one year or others, after the abstract tasks are generated. This enables more accurate generation of the concrete task, as some aspects of the concrete tasks may only become known when they need to be executed. For example, extensions may be created in accordance with an updated address book of the organization, which may change as employees join or depart the organization, or even change their role and position. Each concrete task may be associated with a specific person responsible or otherwise associated with the task. In some cases, the name of the responsible person may be obtained automatically, for example from an organizational chart. In other cases, the name of the responsible person may be set, for example, by an administrator of the migration process.

The process may continue with Monitoring Stage 124 which comprise monitoring user activities related to settings of the system, for example a user activating or attempting to activate a voice mail service, a user changing or attempting to change the extension label, or the like. These actions or attempts may be monitored through accessing the actual servers providing the communication services. Access may be enabled through APIs, monitoring configuration or log files, user reports, or the like.

The process may continue with Feedback Stage 128, in which the collected user actions or attempts may be analyzed and used for updating the concrete tasks that have not been derived or executed yet. For example, the attempts may be provided to a clustering engine, which may identify common attempt types, such as attempts to change an extension label, attempts to activate a disabled service, or the like. Once such actions are identified, they may be used to automatically update some tasks, for example if no additional budget is required. In other cases, the actions may be brought to the attention of the decision makers, and upon their approval used to update or enhance further concrete tasks.

Further feedback can be deduced, for example, from changes in the deployed systems, for example a smaller than expected number of installed extensions may lead to reducing the number of servers serving a region, and vice versa.

Further changes may be initiated by modifications made to similar tasks in the migration of other systems to on-premise communication systems, for example systems installed within organizations or similar nature.

One technical effect of the disclosure relates to automatically designing, deploying, monitoring, and updating the design of the migration process of a communication system, thus providing for easy migration that does not necessitate significant human resources.

Another technical effect of the disclosure relates to monitoring the activities of users with the systems or with similar systems, and their settings, and using the same for enhancing further actions related to setting or changing aspects of the system.

Thus, since large systems are usually not installed at once but rather in stages, the feedback enables the organization to draw conclusions from executed tasks and apply the conclusions when performing tasks of later stages. The system therefore adapts over time such that future installations are automatically executed in accordance with user wishes, which may also be used to enhance the organization policy.

Figure 2:
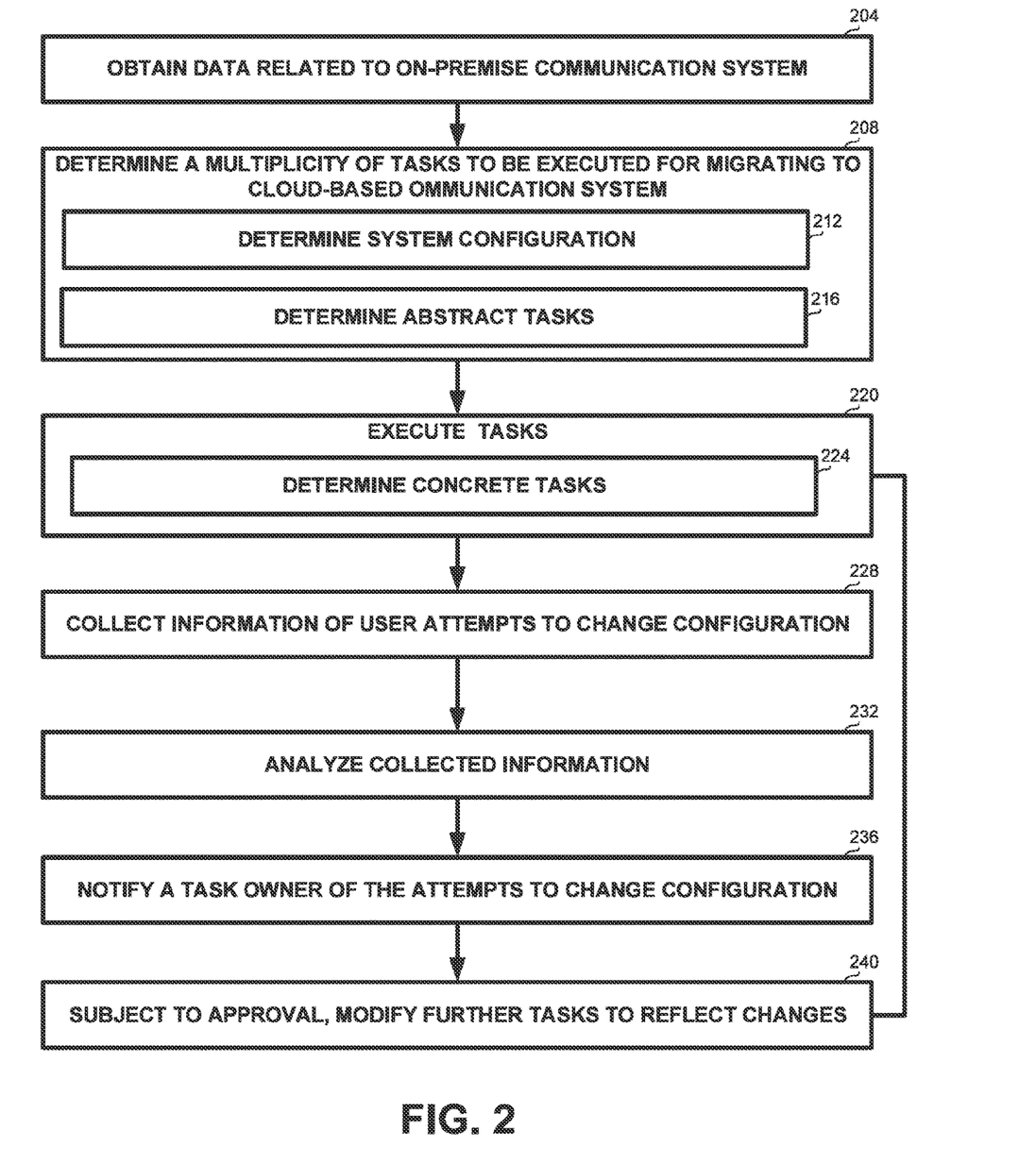
FIG. 2 shows a detailed flowchart diagram of a method for migrating a communication system, in accordance with some exemplary embodiments of the disclosed subject matter.

Referring now to FIG. 2, showing a more detailed flow chart of a method for migrating a communication system from on-premise to cloud-based.

On step 204, data related to an on-premise communication system may be obtained. The data may relate to the equipment and services provided at each site or region of the organization, including geographical distribution of phone lines and extensions, services provided for each extension or group of extensions, servers, server clusters, or the like. The data may further relate to users and to additional entities, including but not limited to devices and end points, and the services that should be associated therewith, in accordance with the sites and geographical regions.

The data may be obtained by interfacing the existing systems, for example via dedicated query modules, APIs, from accessing and parsing configuration or log files, obtained from a user, or the like.

On step 208, a multiplicity of tasks to be executed for migrating to a cloud-based communication system may be derived.

Step 208 may comprise step 212 of determining the required or recommended configuration of the on-premise communication system, for example the number of servers at each geographic region, the settings of each server, the extensions serviced by each server and the provided services, or the like. The configuration may be determined based on predetermined rules, templates, examples learned from previous projects, set by a user, or a combination thereof. For example, an initial configuration may be determined based on predetermined rules applied to template, which may then be enhanced by a user. It will be appreciated that although the system is migrated to a cloud-based system, the geographic region is of interest since it may be beneficial to purchase resources from cloud services located in the vicinity of the organization, for example within the same country, in a neighboring country, within the same continent, or the like.

Task determination step 208 may comprise step 216 of determining abstract tasks for migrating the system. The tasks may be, for example, purchasing a server appropriate for providing cloud services, configuring the server, setting up extensions when the server is configured, or the like. The tasks may be abstract since they comprise a multiplicity of smaller tasks, since some details are missing and will only be known at a later stage, or the like. The tasks may be arranged in a text file, as a to-do list, as a Gantt chart which demonstrates the execution order or dependencies, i.e., which tasks need to be completed before another task may be performed. Each abstract task may be associated with a role that will later be assigned to a person carrying the role, such as an account manager, a technician, or the like. Each abstract task may be associated with one or more parameters for which values may later be assigned, for example "setting extensions in a European site of the organization". The tasks may be determined based on predetermined rules, templates, examples learned from previous projects, set by a user, or a combination thereof. For example, initial tasks may be determined based on predetermined rules applied to template, which may then be enhanced by a user.

In some exemplary embodiments, the abstract tasks may be derived automatically from the configuration. In some embodiments, the tasks may be derived from a plurality of options, based upon services provided by the existing on premise communication system. In some embodiments, the tasks may be derived using predetermined rules, for example if a configuration contains a server appropriate for providing cloud computing services, then a server needs to be purchased, installed, and configured; if the configuration contains extensions, they need to be set up after the server is configured, or the like. In other embodiments, the tasks may be derived using templates, received from a user, or a combination thereof, in which initial abstract tasks are generated automatically, and then reviewed and changed by a user.

On step 220, at least some of the tasks may be executed.

Step 220 may comprise step 224 of determining at least one concrete task from an abstract task. The concretization may include assigning specific values to parameters, for example a name or extension number to an extension that needs to be set up, a specific responsible person to a task, a specific equipment type or a vendor for purchasing equipment, or the like. Each concrete task may be associated with an indication whether it is to be performed automatically, manually, or a combination thereof. In some embodiments, initial execution is automatic, optionally followed by human enhancement. Automatic derivation may use templates, rules, learning engines, or any other method. The concrete tasks may also be arranged in a text file, as a to-do list, as a Gantt chart or the like. The determined tasks can utilize additional sources for obtaining information that was not available, or may have changed since the abstract tasks have been determined. The sources may be internal or external to the organization, for example an updated address book of the organization in order to assign extensions to the current man power, equipment that is currently available for purchasing and price list, or As detailed above, some tasks may be executed automatically, others may need manual execution, and further others may require a combination thereof.

The list or Gantt chart of tasks of the abstract or concrete tasks may be updated with the executed tasks, such that additional tasks may become ready for execution. In some embodiments, if an abstract task becomes possible, new concrete tasks may be derived therefrom and may be executed.

On step 228, which may be an ongoing stage when the cloud-based system or part thereof is in use, information may be collected which relates to the usage made by the system, and particularly information related to the settings as may have been changed or attempted to be changed by users. The information may be collected by interfacing with the employed cloud-based system, from configuration or log files, user reports, administrator reports, or the like. For example, it may be recorded that a user activated and enabled voice message service, and failed in activating a disabled conference call service.

On step 232, the collected information may be analyzed. For example, the users' actions or attempts may be clustered to identify frequent action types. In further examples the actions or attempts may be classified to obtain frequency of known action types, or the like. In one example, it may be deduced that users often attempted to add new functionality in the cloud-based system, such as to activate a disabled voice mail service, which indicates that such service is desired and it may be required to enable it. In another example, it may be discovered that users often attempted to change the way their name appears on the extension, i.e., to change the label structure of an extension in the cloud-based communication system, which may suggest that a different naming convention may be set as default.

It will be appreciated that some abstract tasks may be executed before concrete tasks are derived, thus actions associated with steps 216, 220 and 224 may take place at any intervening order.

Thus, for some abstract tasks, a concrete task is determined and executed, while for other abstract tasks the concrete asks are created or modified after such modification is deemed required following execution of previous tasks.

On step 236, one or more owners of tasks associated with frequent changes or attempts may be notified. A change suggestion may be provided, for example "enable voice mail". The owners can accept the suggestion, reject it, transfer to another role holder, for example if the suggestion involves financial aspects, or make changes, for example indicate a different naming convention for extensions.

On step 240, subject to the approval and/or changes to the attempted actions, further concrete tasks that have not been executed yet may be modified in accordance with the change.

Execution may then return to step 220, for determining further concrete tasks from pending abstract tasks. The newly derived tasks may also reflect and be derived in accordance with the changes.

Figure 3:
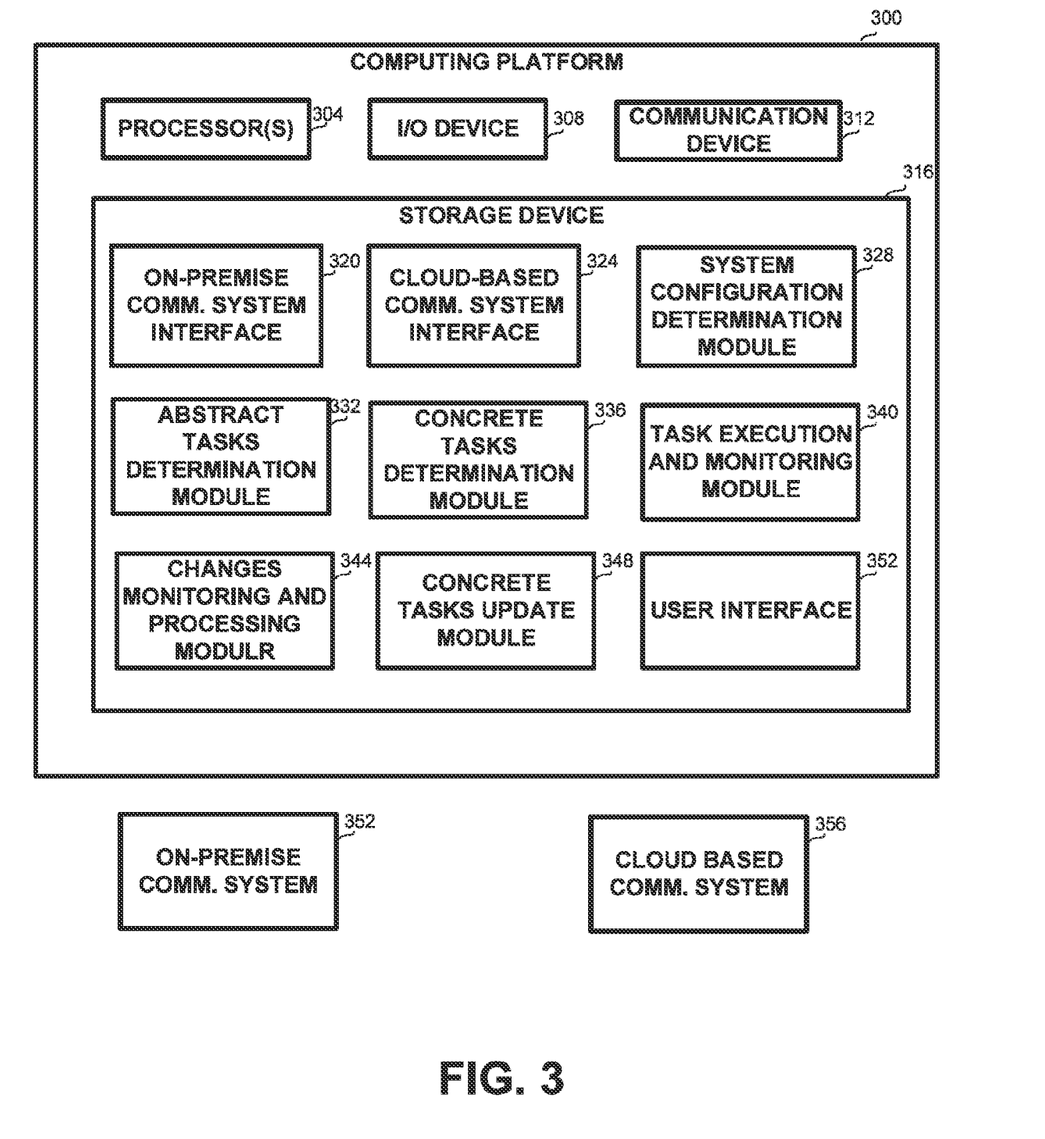
FIG. 3 shows a block diagram of a system for migrating a communication system, in accordance with some exemplary embodiments of the disclosed subject matter.

Referring now to FIG. 3, showing a block diagram of a system for migrating from on-premise communication system to a cloud based communication system, in accordance with the disclosure.

The system may comprise one or more Computing Platforms 300. In some embodiments, Computing Platform 300 may be a server, and provide services to one or more clients. In some embodiments, Computing Platform 300 may be a part of a computer network.

Computing Platform 300 may comprise a Processor 304 which may be one or more Central Processing Unit (CPU), a microprocessor, an electronic circuit, an Integrated Circuit (IC) or the like. Processor 304 may be configured to provide the required functionality, for example by loading to memory and activating the modules stored on Storage Device 312 detailed below.

It will be appreciated that Computing Platform 300 may be implemented as one or more computing platforms collocated or not, which may be in communication with one another. It will also be appreciated that Processor 304 may be implemented as one or more processors, whether located on the same platform or not.

Computing Platform 300 may also comprise Input/Output (I/O) Device 308 such as a display, a pointing device, a keyboard, a touch screen, or the like. I/O Device 308 may be utilized to receive input from and provide output to a user, for example receive configuration settings, show task execution progress, or the like.

Computing platform 300 may comprise Communicating Device 312 for communicating with other computing platforms via any communication channel, such as a Wide Area Network, a Local Area Network, intranet, Internet or the like.

Computing Platform 300 may also comprise a Storage Device 316, such as a hard disk drive, a Flash disk, a Random Access Memory (RAM), a memory chip, or the like. In some exemplary embodiments, Storage Device 316 may retain program code operative to cause Processor 304 to perform acts associated with any of the modules listed below or steps of the methods of FIG. 1 or FIG. 2 above. The program code may comprise one or more executable units, such as functions, libraries, standalone programs or the like, adapted to execute instructions as detailed below.

Storage Device 316 may comprise On-Premise Communicating System Interface 320 for communicating with one or more existing on-premise communication system. The interface may use an API of the existing system, access configuration or settings files, or the like. On-Premise Communicating System Interface 320 may be used for obtaining information about the current system, such that the new system may provide the same, similar or additional services, in an advantageous manner, for example cheaper and more reliable or efficient.

Storage Device 316 may comprise Cloud-Based Communicating System Interface 324 for communicating with the cloud-based communication system being installed. The interface may use an API of the cloud-based communication system, access configuration or settings files, or the like. Cloud-Based Communicating System Interface 324 may be used for monitoring the execution of one or more concrete tasks, and attempts by users or administrators to make changes to the cloud-based system.

Storage Device 316 may comprise System Configuration Determination Module 328, for receiving a description of a currently used on-premise system, and determining a configuration for the cloud-based system, for example number and distribution for servers, number of extensions, extension configurations, or the like. System Configuration Determination Module 328 can interface with User Interface (UI) module 352 for receiving user input, for example a different configuration, or changes to an automatically generated configuration.

Storage Device 316 may comprise Abstract Tasks Determination Module 332, for determining one or more abstract, or high-level tasks to be performed as part of migrating to the cloud-based system, for example "configuring a server", "installing extensions" or the like. The tasks may be derived automatically from the configuration determined by System Configuration Determination Module 328, manually using for example UI module 352, or a combination thereof.

Storage Device 316 may comprise Concrete Tasks Determination Module 336, for determining one or more concrete tasks. The concrete tasks may be carried out automatically or manually, as part of migrating to the cloud-based system. The tasks may be derived automatically from the abstract tasks determined by Abstract Tasks Determination Module 332, manually using for example UI module 352, or a combination thereof.

Storage Device 316 may comprise Task Execution and Monitoring Module 340 for executing one or more of the automatically executable concrete tasks, and monitoring execution of the manually executed tasks. Task Execution and Monitoring Module 340 may activate concrete tasks determination module for determining one or more concrete tasks for one or more abstract tasks. Task Execution and Monitoring Module 340 may indicate the completed tasks in the Gantt, and may enable additional concrete tasks to be derived from abstract tasks, once the pre-required tasks have been executed.

Storage Device 316 may comprise Changes Monitoring and Processing Module 344 for monitoring changes or change attempts made by users, administrators, or the like to the installed cloud-based system. Changes or change attempts may be collected over at least a predetermined period of time, which may be absolute or may depend on the system configuration, the number of users or the like. The changes or change attempts may also be collected until at least a predetermined number of changes or change attempts have been collected, or the like. The changes and change attempt may then be processed to identify frequent change types.

Storage Device 316 may comprise Concrete Task Update Module 348 for updating existing concrete tasks in accordance with the frequently made or attempted changes. Concrete Task Update Module 348 may also change the templates or other mechanisms upon which future concrete types are derived from abstract tasks. Concrete Task Update Module 348 may also be responsible for notifying a person in charge about the requested change, and update concrete tasks once approval is obtained.

Storage Device 212 may comprise User Interface 352 for receiving input or providing output to one or more users of the migration system, such as administrators. The input may relate, for example, to defining abstract tasks, deriving concrete tasks, updating concrete tasks, or the like.

Example 1

"Car West", referred to as a client, is a global enterprise, that manages its own telephony services on-premise. The client is now looking for an alternative solution of moving to a cloud-based telephony solution offered by "Better Telekom", referred to as a supplier. The client has 14 sites and 70 subscriptions as shown in Table 1 below:

| Site Name | Country | Amount |
| --- | --- | --- |
| Singapore Office | Singapore | 5 |
| Switzerland Office | Switzerland | 5 |
| Fort Worth TX | United States | 5 |
| Denver | United States | 5 |
| San Francisco | United States | 5 |
| Austria Office | Austria | 5 |
| Boston Office | United States | 5 |
| Auburn WA | United States | 5 |
| DC Office | United States | 5 |
| World Trade Center | United States | 5 |
| Philadelphia PA | United States | 5 |
| Atlanta Office | United States | 5 |
| Chicago IL | United States | 5 |
| Kansas City | United States | 5 |

A recommended configuration for supporting these needs is automatically generated by the system as follows:

US region: 55 subscriptions,
Platform Size: 2,500 Max Capacity (No Computer Telephony Integration (CTI)) 1,875 Max Capacity (CTI, UCCx),
CUAC STND<1 CPU (a specific setting for Cisco® equipment),
4 GB Virtual Read Only Memory (VRAM),
80 GB virtual disk (vDisk)
  It is configured that the US region will be served by two servers as follows:
Server 1:
  Type: Publisher
  CUAC STND: No
  Annunciator (ANN): No
  Call Processing: Yes
  Conferencing (Conf): No
  CTI: No
  extension mobility cross clusters (EMCC): No
  Audio stream for hold: No
  Media Termination Point (MTP): No
  trivial file transfer protocol (TFTP): No
  Internet Data Center (IDC): New York
Server 2:
  Type: Subscriber 1
  CUAC STND: No
  ANN: No
  Call Processing: Yes
  Conf: No
  CTI: No
  EMCC: No
  MOH: Yes
  MTP: No
  TFTP: Yes
  IDC: New York
    Europe, middle East and Africa (EMEA) region: 10 subscriptions,
    Platform Size: 2,500 Max Capacity (No Computer Telephony Integration (CTI)) 1,875 Max Capacity (CTI, UCCx),
    CUAC STND<1 CPU (a specific setting for Cisco® equipment,
    4 GB Virtual Read Only Memory (VRAM),
    80 GB virtual disk (vDisk)
      The EMEA region will be served by two servers as follows:
Server 1:
  Type: Publisher
  CUAC STND: No
  Annunciator (ANN): No
  Call Processing: Yes
  Conferencing (Conf): No
  CTI: No
  extension mobility cross clusters (EMCC): No
  Audio stream for hold: No
  Media Termination Point (MTP): No
  trivial file transfer protocol (TFTP): No
  Internet Data Center (IDC): Munich
Server 2:
  Type: Subscriber 1
  CUAC STND: No
  ANN: No
  Call Processing: Yes
  Conf: No
  CTI: No
  EMCC: No
  MOH: Yes
  MTP: No
  TFTP: Yes
  IDC: Munich
    Asia Pacific (APAC) region: 5 subscriptions,
    platform Size: 2,500 Max Capacity (No Computer Telephony Integration (CTI)) 1,875 Max Capacity (CTI, UCCx),
    CUAC STND<1 CPU (a specific setting for Cisco® equipment,
    4 GB Virtual Read Only Memory (VRAM),
    80 GB virtual disk (vDisk)
      The APAC region will be served by two servers as follows:
Server 1:
  Type: Publisher
  CUAC STND: No
  ANN: No
  Call Processing: Yes
  Conf: No
  CTI: No
  EMCC: No
  Audio stream for hold: No
  MTP: No
  TFTP: No
  IDC: Shanghai
Server 2:
  Type: Subscriber 1
  CUAC STND: No
  ANN: No
  Call Processing: Yes
  Conf: No
  CTI: No
  EMCC: No
  MOH: Yes
  MTP: No
  TFTP: Yes
  Internet Data Center (IDC): Shanghai Thus, based on the existing on-premise solution, no voice mail server is suggested as part of the referenced design. The current configuration is imported from the current solution as described in association with step 212 of FIG. 2. A project Gantt chart is automatically generated, to initiate the implementation of the solution.

For some sites, abstract and concrete tasks are generated as described in association with step 216 and step 224 of FIG. 2, the sites are tested and moved from the on-premise solution to a cloud-based telephony solution.

End-user activity is collected by the system as described in association with step 228 of FIG. 2, and analyzed as described in association with step 232 FIG. 2, to identify that users are trying to add a voice mail account.

The activity is monitored, and a global project manager is notified as described in association with step 236 of FIG. 2 to examine upscaling the solution to support additional voice mail services moving forward as described in association with step 240 of FIG. 2.

Example 2

"A client has 2 sites. One in NYC, NY and the other in Halifax, Canada. Each site has 10 subscriptions (end users). A project Gantt is automatically generated to initiate implementation of the solution. User level configurations are extracted from legacy environment, transformed into new conventions and provisioned into the cloud-based environment.

The Directory number Labels are set to indicate the directory number.

For some sites, abstract and concrete tasks are generated, the sites are tested and moved from the on-premise solution to a cloud-based telephony solution.

End-user activity is monitored by the system, and it is noticed that users are trying to modify their directory number Label fields, into "FirstName"&"LastName"&"DirectoryNumber".

Once the activity is noticed, a data collection officer is notified, to examine new options of directory numbers labels transformations, for better implementation of future sites, hence improving customer satisfaction.

The present disclosed subject matter may be a system, a method, and/or a computer program product. The computer program product may include a computer readable storage medium (or media) having computer readable program instructions thereon for causing a processor to carry out aspects of the disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the disclosed subject matter.

Aspects of the disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosed subject matter has been presented for purposes of illustration and description, but is not intended to be exhaustive or limited to the invention in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method, comprising:
    obtaining data related to an on premise communication system;
    determining a multiplicity of tasks to be executed for migrating the on premise communication system to a cloud-based communication system, wherein each task from the multiplicity of tasks is associated with a type, a configuration, and an owner;
    collecting information of a multiplicity of user attempts to change the configuration during or following execution of some of the multiplicity of tasks of a particular type, wherein the information of the multiplicity of user attempts is obtained from an Application Program Interface (API) of a cloud system providing the cloud-based communication system;
    subject to the multiplicity of user attempts exceeding a predetermined amount, notifying an owner of a task associated with the configuration; and
    subject to approval by the owner, modifying further tasks of the particular type yet to be executed, to conform to the configuration,
    wherein the multiplicity of tasks comprise a multiplicity of abstract tasks, and wherein the method further comprises:
    for each abstract task in a first portion of the multiplicity of abstract tasks, determining a concrete task thereof and executing the concrete task thereof, wherein said collecting information is performed after the concrete tasks of the first portion are executed; and
    executing a second portion of the multiplicity of abstract tasks, wherein the second portion comprises the further tasks of the particular type yet to be executed, wherein said executing comprises determining concrete tasks for the second portion and executing thereof.

2. The method of claim 1, further comprising executing the some of the multiplicity of tasks of the particular type.

3. The method of claim 1, wherein the user attempts comprise an attempt to add a new functionality in the cloud-based communication system.

4. The method of claim 1, wherein the user attempts comprise an attempt to change label structure of an extension in the cloud-based communication system.

5. The method of claim 1, further comprising modifying tasks of the particular type to conform to the configuration, when migrating a second on-premise communication system.

6. The method of claim 1, wherein the multiplicity of tasks are created automatically from a plurality of options, based upon services provided by the on premise communication system.

7. The method of claim 1, wherein the multiplicity of tasks are arranged in a Gantt chart indicating execution order.

8. The method of claim 1, wherein the information of the multiplicity of user attempts is collected by monitoring execution of the multiplicity of tasks and user actions related to the configuration.

9. A system having a processor, the processor being configured to perform the steps of:
    obtaining data related to an on premise communication system;
    determining a multiplicity of tasks to be executed for migrating the on premise communication system to a cloud-based communication system, wherein each task from the multiplicity of tasks is associated with a type, a configuration, and an owner;
    collecting information of a multiplicity of user attempts to change the configuration during or following execution of some of the multiplicity of tasks of a particular type, wherein the information of the multiplicity of user attempts is obtained from an Application Program Interface (API) of a cloud system providing the cloud-based communication system;
    subject to the multiplicity of user attempts exceeding a predetermined amount, notifying an owner of a task associated with the configuration; and
    subject to approval by the owner, modifying further tasks of the particular type yet to be executed, to conform to the configuration,
    wherein the multiplicity of tasks comprise a multiplicity of abstract tasks, and wherein the processor is further configured to:
    for each abstract task in a first portion of the multiplicity of abstract tasks, determining a concrete task thereof and executing the concrete task thereof, wherein said collecting information is performed after the concrete tasks of the first portion are executed; and
    executing a second portion of the multiplicity of abstract tasks, wherein the second portion comprises the further tasks of the particular type yet to be executed, wherein said executing comprises determining concrete tasks for the second portion and executing thereof.

10. The system of claim 9, wherein the processor is further configured to execute the some of the multiplicity of tasks of the particular type.

11. The system of claim 9, wherein the user attempts include an attempt to add a new functionality in the cloud-based communication system, or an attempt to change label structure of an extension in the cloud-based communication system.

12. The system of claim 9, wherein the processor is further configured to modify tasks of the particular type to conform to the configuration, when migrating a second on premise communication system.

13. The system of claim 9, wherein the multiplicity of tasks are created automatically from a plurality of options, based upon services provided by the on premise communication system.

14. The system of claim 9, wherein the multiplicity of tasks are arranged in a Gantt chart indicating execution order.

15. The system of claim 9, wherein the information of the multiplicity of user attempts is collected by monitoring execution of the multiplicity of tasks and user actions related to the configuration.

16. A computer program product comprising a non-transitory computer readable medium retaining program instructions, which instructions when read by a processor, cause the processor to perform:
   obtaining data related to an on premise communication system;
   determining a multiplicity of tasks to be executed for migrating the on premise communication system to a cloud-based communication system, wherein each task from the multiplicity of tasks is associated with a type, a configuration, and an owner;
   collecting information of a multiplicity of user attempts to change the configuration during or following execution of some of the multiplicity of tasks of a particular type, wherein the information of the multiplicity of user attempts is obtained from an Application Program Interface (API) of a cloud system providing the cloud-based communication system;
   subject to the multiplicity of user attempts exceeding a predetermined amount, notifying an owner of a task associated with the configuration; and
   subject to approval by the owner, modifying further tasks of the particular type yet to be executed, to conform to the configuration,
   wherein the multiplicity of tasks comprise a multiplicity of abstract tasks, and wherein the instructions further cause the processor to perform:
   for each abstract task in a first portion of the multiplicity of abstract tasks, determining a concrete task thereof and executing the concrete task thereof, wherein said collecting information is performed after the concrete tasks of the first portion are executed; and
   executing a second portion of the multiplicity of abstract tasks, wherein the second portion comprises the further tasks of the particular type yet to be executed, wherein said executing comprises determining concrete tasks for the second portion and executing thereof.

* * * * *